(12) United States Patent
Kenner

(10) Patent No.: US 12,462,932 B2
(45) Date of Patent: Nov. 4, 2025

(54) APPARATUS, METHOD, AND SYSTEM FOR MEDICAL INSTRUMENT MANAGEMENT AND DISTRIBUTION

(71) Applicant: Mark Kenner, Mt. Pleasant, SC (US)

(72) Inventor: Mark Kenner, Mt. Pleasant, SC (US)

(*) Notice: Subject to any disclaimer, the term of this patent is extended or adjusted under 35 U.S.C. 154(b) by 982 days.

(21) Appl. No.: 17/471,447

(22) Filed: Sep. 10, 2021

(65) Prior Publication Data

US 2022/0076815 A1 Mar. 10, 2022

Related U.S. Application Data

(60) Provisional application No. 63/076,554, filed on Sep. 10, 2020.

(51) Int. Cl.
| | |
|---|---|
| *G16H 40/40* | (2018.01) |
| *A61B 50/00* | (2016.01) |
| *A61B 50/10* | (2016.01) |
| *A61B 50/13* | (2016.01) |
| *A61B 50/18* | (2016.01) |

(Continued)

(52) U.S. Cl.
CPC .............. *G16H 40/40* (2018.01); *A61B 50/00* (2016.02); *A61B 50/13* (2016.02); *A61B 50/18* (2016.02); *A61B 50/20* (2016.02); *G16H 40/20* (2018.01); *A61B 50/10* (2016.02);
(Continued)

(58) Field of Classification Search
CPC ........ G16H 40/40; G16H 40/20; A61B 50/10; A61B 50/18; A61B 2050/105; A61B 2050/185; A61B 2090/0804; A61B 50/13; A61B 50/00; A61B 50/20; A61B 50/30; A61G 12/001
See application file for complete search history.

(56) References Cited

U.S. PATENT DOCUMENTS

| | | | | |
|---|---|---|---|---|
| 4,910,386 A | * | 3/1990 | Johnson ................. | A61C 19/02 219/385 |
| 4,927,214 A | | 5/1990 | Kaufman et al. | |

(Continued)

FOREIGN PATENT DOCUMENTS

DE 102017117180 A1 * 1/2019 ............... B25H 5/00

OTHER PUBLICATIONS

International Search Report and Written Opinion issued on Dec. 17, 2021 in corresponding International Patent Application No. PCT/US2021/049798; 11 pages.

(Continued)

*Primary Examiner* — Thomas Randazzo
(74) *Attorney, Agent, or Firm* — Maier & Maier, PLLC

(57) ABSTRACT

A system for medical instrument management and distribution. The system can include at least one storage enclosure for storing and dispensing medical instruments, and at least one storage structure disposed within the enclosure. The storage structure can be adapted to store and dispense a plurality of medical instruments, and can have a plurality of discrete instrument storage locations. A software application is adapted to track and manage medical instrument inventory, locations, and distribution. Each discrete instrument storage location is identified by an indicator controllable by the software application so as to indicate to a user an appropriate instrument storage location for placement or removal of a desired medical instrument.

18 Claims, 9 Drawing Sheets

(51) Int. Cl.
*A61B 50/20* (2016.01)
*A61B 90/00* (2016.01)
*G16H 40/20* (2018.01)

(52) U.S. Cl.
CPC ... *A61B 2050/105* (2016.02); *A61B 2050/185* (2016.02); *A61B 2090/0804* (2016.02)

(56) References Cited

U.S. PATENT DOCUMENTS

| | | | |
|---|---|---|---|
| 5,805,455 A | 9/1998 | Lipps | |
| 5,905,653 A | 5/1999 | Higham et al. | |
| 6,890,138 B1 * | 5/2005 | Myrick | B60P 7/0892 410/97 |
| 7,052,097 B2 | 5/2006 | Meek, Jr. et al. | |
| 7,463,947 B1 | 12/2008 | Frederick et al. | |
| 7,809,470 B2 | 10/2010 | Shoenfeld | |
| 8,335,588 B2 * | 12/2012 | Rahilly | G07F 17/0092 700/242 |
| 8,412,375 B2 | 4/2013 | Schifman et al. | |
| 9,887,562 B2 * | 2/2018 | Racenet | H02J 7/0042 |
| 9,891,658 B2 | 2/2018 | Michael | |
| 11,439,558 B2 * | 9/2022 | Mangiardi | A47L 11/282 |
| 2003/0201697 A1 | 10/2003 | Richardson | |
| 2005/0062238 A1 * | 3/2005 | Broadfield | A61B 50/18 280/1 |
| 2005/0236940 A1 * | 10/2005 | Rockoff | B62B 3/00 312/209 |
| 2008/0316045 A1 * | 12/2008 | Sriharto | G16H 20/13 700/214 |
| 2009/0091453 A1 * | 4/2009 | Ishida | G07F 11/60 340/572.1 |
| 2010/0235179 A1 * | 9/2010 | Kienle | G16Z 99/00 700/214 |
| 2011/0196538 A1 * | 8/2011 | Michael | A61B 50/18 700/275 |
| 2013/0248598 A1 * | 9/2013 | Dehnadi | G07F 9/026 235/385 |
| 2016/0371943 A1 * | 12/2016 | Young | G08B 3/10 |
| 2017/0217011 A1 | 8/2017 | Savage et al. | |
| 2018/0123365 A1 | 5/2018 | Racenet et al. | |
| 2022/0301698 A1 * | 9/2022 | Furusawa | G16H 40/20 |

OTHER PUBLICATIONS

Extended Search Report issued on Sep. 5, 2024, in corresponding European Application No. 21867647.6, 8 pages.

* cited by examiner

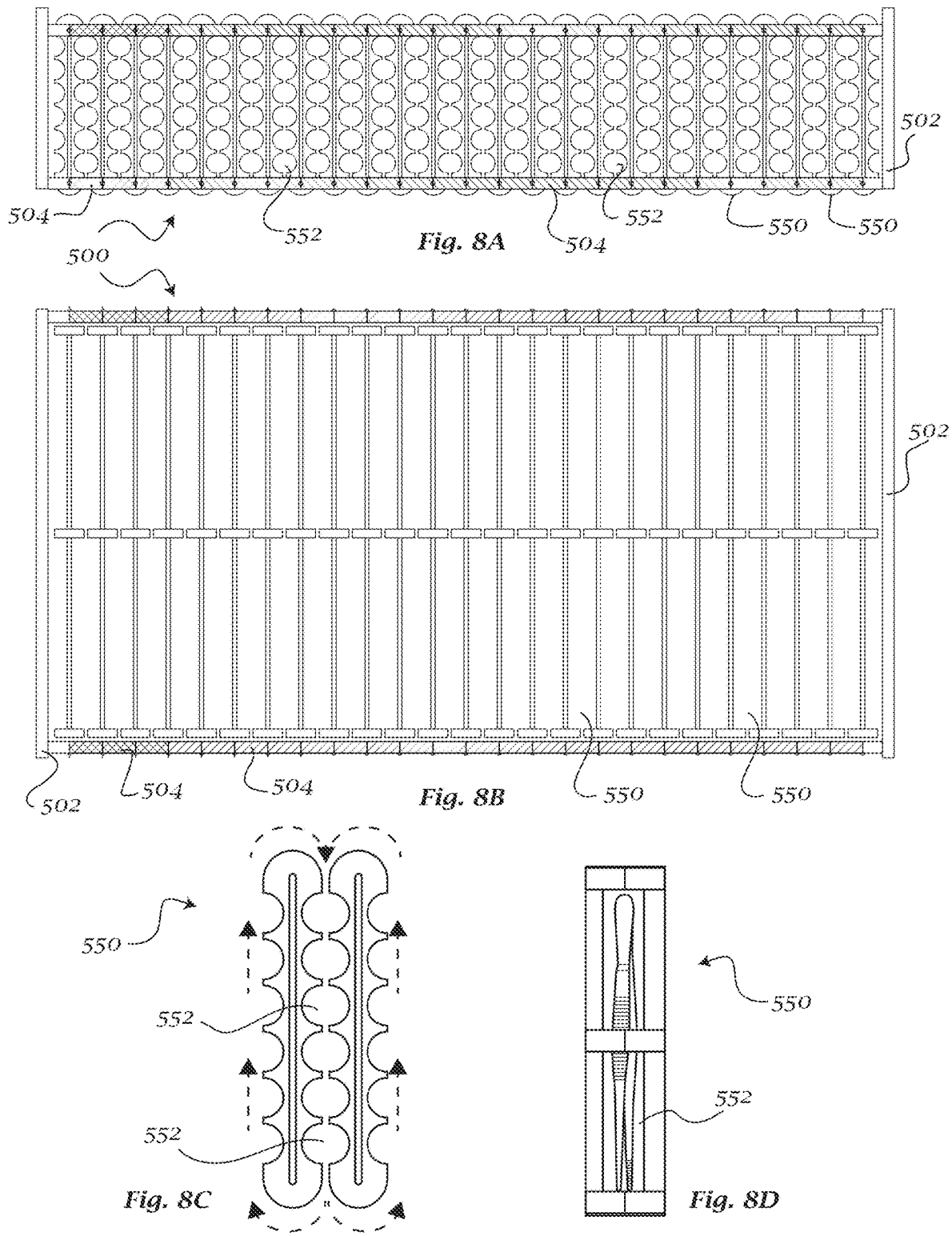

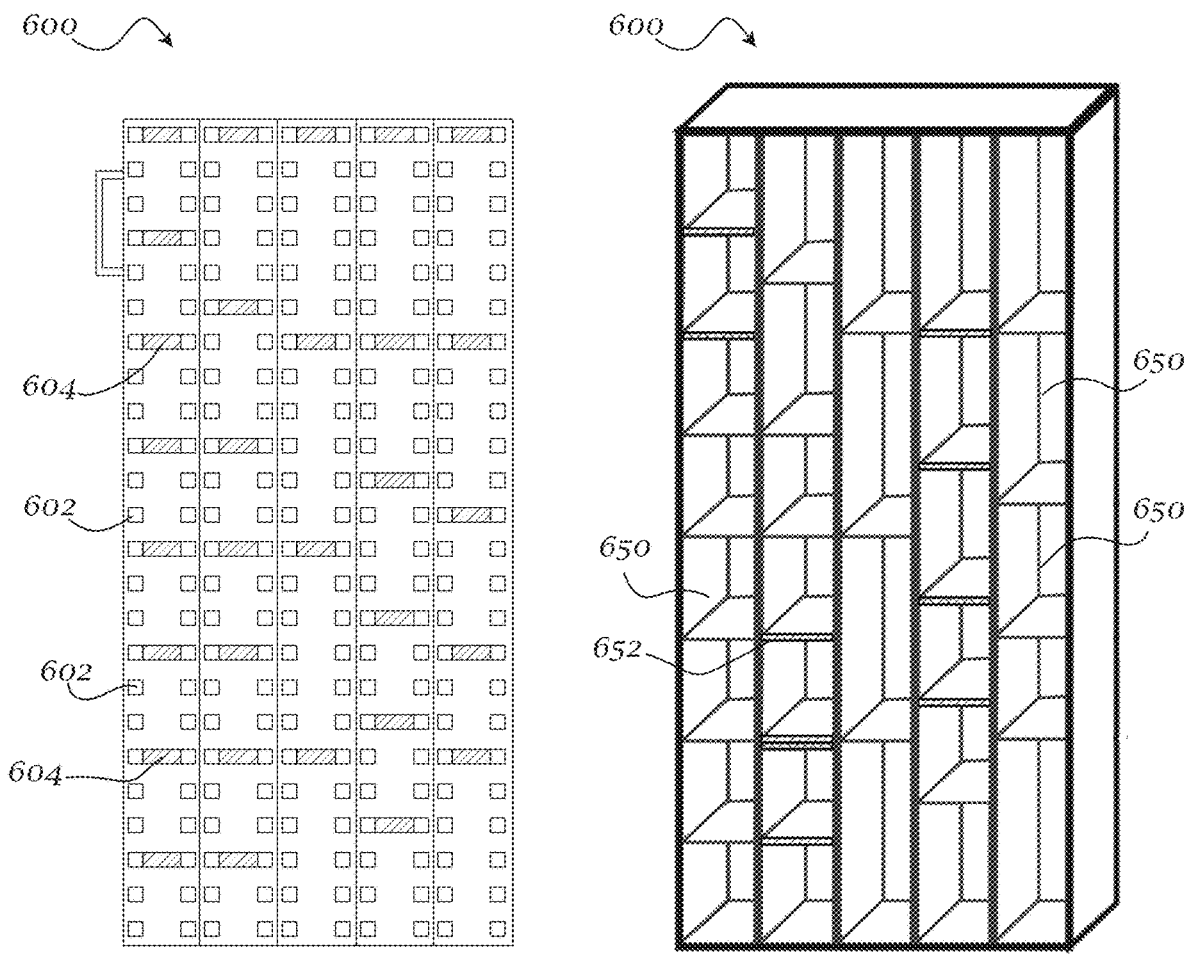
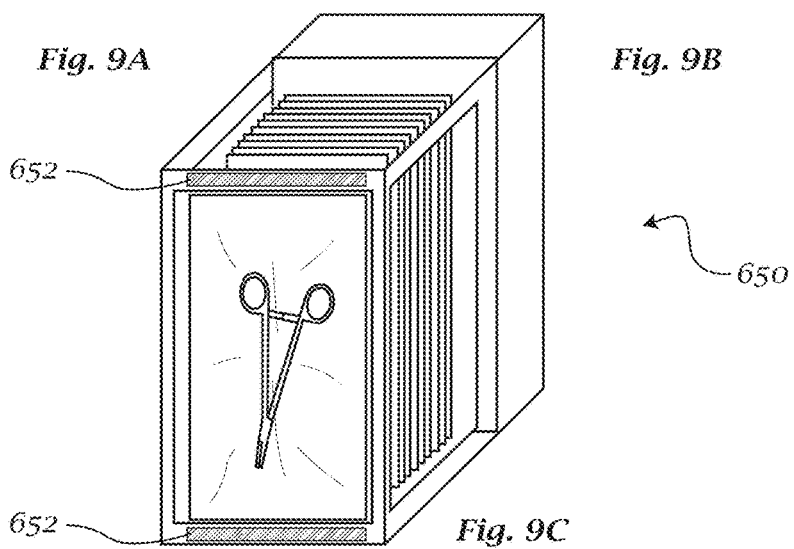
Fig. 9A  Fig. 9B  Fig. 9C

APPARATUS, METHOD, AND SYSTEM FOR MEDICAL INSTRUMENT MANAGEMENT AND DISTRIBUTION

CROSS-REFERENCE TO RELATED APPLICATIONS

This application claims priority to U.S. Provisional Application 63/076,554, filed Sep. 10, 2020, and entitled Apparatus, Method, and System for Medical Instrument Management and Distribution, the entire contents of which are hereby incorporated by reference.

BACKGROUND

The documented waste in the U.S. healthcare system is significant, and induces health systems to move away from fee-for-service medicine, where insurers and the government have historically paid for the volume of healthcare delivered. Instead, health plans are increasingly paying via value-based models that reward doctors and hospitals for achieving quality measures and outcomes. Healthcare leaders are aware of these issues and have begun implementing measures that focus on the reduction of waste. Cleaning and sterilization of surgical instruments and medical equipment accounts for $165 billion per year healthcare spending in the United States, with an estimated $49 billion in waste. Key sources of waste in existing sterile processing systems include labor, reprocessing unused instruments, and operating room (OR) delays due to incorrect instruments or contamination.

Furthermore, every hospital reprocesses thousands of surgical instruments daily. Cleaning, maintaining, and organizing instruments is highly technical and labor-intensive. It requires the coordination of multiple, highly specialized experts. Labor in sterile processing involves technicians decontaminating, organizing, and packaging instruments and medical devices. The work is technically demanding, time-sensitive, prone to error and high employee turnover. By automating set assembly and instrument distribution, hospitals will see a vast improvement in efficiency, substantial cost savings, an increase in productivity, reduced time for set assembly, fewer errors, increase patient safety, and measurable surgeon satisfaction.

As healthcare systems continue to adapt to reforms that drive value-based care, solutions that address waste and spending are becoming increasingly important. Delivering high quality, low-cost healthcare involves all areas of a healthcare organization, including perioperative services, supply chain, and sterile processing departments (SPDs). Being able to effectively capture the discreet data of the types and quantities of instruments used per procedure can allow a new value-based analysis that not currently available. In order to obtain this data, the underlying processes need to be automated and digitized.

A solution that addresses key sources of waste in sterile processing, and provides a modular unit for surgical instruments that minimizes physical space requirements

SUMMARY

According to at least one exemplary embodiment, a system for medical instrument management and distribution. The system can include at least one storage enclosure for storing and dispensing medical instruments, and at least one storage structure disposed within the enclosure. The storage structure can be adapted to store and dispense a plurality of medical instruments, and can have a plurality of discrete instrument storage locations. A software application is adapted to track and manage medical instrument inventory, locations, and distribution. Each discrete instrument storage location is identified by an indicator controllable by the software application so as to indicate to a user an appropriate instrument storage location for placement or removal of a desired medical instrument.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 8A shows a top view of an exemplary embodiment of a storage cartridge.

FIG. 8B shows a side view of an exemplary embodiment of a storage cartridge.

FIG. 8C shows an exemplary embodiment of a rotating grasp mechanism.

FIG. 8D shows an exemplary embodiment of a rotating grasp mechanism.

FIG. 9A shows an exemplary embodiment of a cartridge board.

FIG. 9B shows an exemplary embodiment of a cartridge board.

FIG. 9C shows an exemplary embodiment of an instrument cartridge.

DETAILED DESCRIPTION

Aspects of the invention are disclosed in the following description and related drawings directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Figure 1:
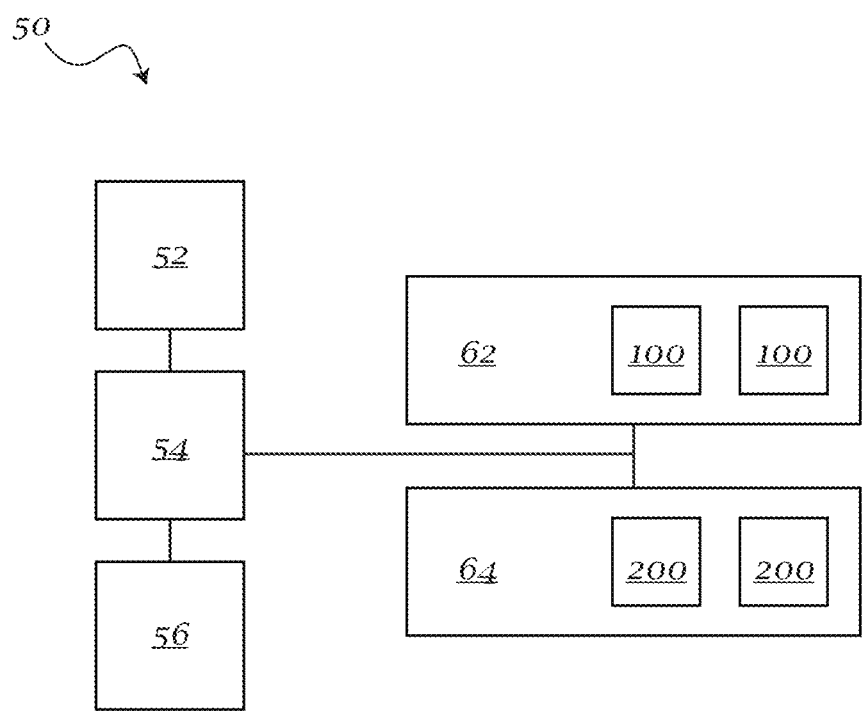
FIG. 1 shows an exemplary embodiment of a system for medical instrument management and distribution.

According to at least one exemplary embodiment, and as shown in FIG. 1, a system for medical instrument management and distribution 50 is disclosed. System 50 can provide an instrument management solution, including data collection, decision support, and instrument management within the OR and SPD. System 50 can include one or more storage structures, such as medical cabinets or mobile case carts. The storage structures can provide a medical instrument set assembly solution and an instrument vending solution. Using supply utilization and provider data, such storage structures can contain smaller surgical sets that include, for example, only essential instruments. Additional instruments may be stored in racks within the storage structures and can be distributed on an ad hoc basis via the interface and vending mechanisms. Reducing the exposure of unused instruments to the sterile processing cycle can alleviate a significant burden on SPDs and can directly reduce waste issues, while ad hoc availability of additional instruments can facilitate a reduction of OR delays and increased patient safety. Furthermore, utilizing provider and patient data can reduce the occurrence of surgical trays with excessive and unused instruments, which typically represent around 75% of instruments prepared for a typical surgical procedure.

The apparatus, system, and method according to the embodiments disclosed herein can include several components. A Decision Support System (DSS) 52 may be adapted to accurately capture utilization data and apply artificial intelligence for predictive analytics to drive standardization, improving surgical efficiencies and outcomes. The DSS 52 may leverage business intelligence in medical device utilization trends so as to predict and optimize equipment ordering, reduce waste, and increase efficiencies in the SPD. Furthermore, the DSS 52 may capture instrument usage data at the individual instrument level, rather than at an instrument tray level. The DSS 52 may integrate into existing enterprise healthcare systems to facilitate SPD optimization and improved quality while directly linking device and instrument use to patient outcomes.

System 50 can further include a storage and vending system 54 adapted to retrieve and dispense a large number (for example, 20,000 or more) unique surgical instrument patterns safely and reliably. The storage and vending system may utilize blockchain and AI technologies to purchase, manage, and control instrument inventory. High-definition, touch-sensitive workstation screens, or other human interface systems, and remote device management software may be provided. The system and apparatus may be remotely diagnosable and repairable.

An SPD software application 56 may be adapted for ease-of-use by SPD technicians when building surgical sets and stocking the storage structures. Software 56 may be provided on workstations accessible by the user and may further control indicator lighting of the storage and vending systems, and may control and manage the instrument distribution system. Software combined with LED lighting can guide users step-by-step in loading and distribution of instruments. A cloud-based Wi-Fi compatible and HIPAA-compliant system can provide 24/7 access to inventory information, user tracking, electronic ordering, and instruments dispensed for a specific patient type, procedure, or surgeon preference. The system may also include a central database and be controlled using procedure software. Exact instrument usages in specific procedures or surgical practices may be tracked. The workstation may display instrument images with part numbers, descriptions, item counts per procedure, daily item counts, and other desired information. Users may be guided through each required step of set assembly, inventory levels, inventory locations, service needs, and so forth.

Additional features of system 50 may include a unique storage structure interface system for tray and ad hoc item retrieval and documentation; failovers and fail-safes that maintain high availability (for example, power, cooling, secure access) to SPD and OR staff, while preventing injuries by lifting unnecessary heavy instrument sets and errors in tray and instrument retrieval; durability and reduced component degradation from servicing, cleaning, sterilizing, and transporting the storage structures; moisture control and particle filtration for storage structure internals to protect from contamination and package degradation; and integrated sterility assurance systems to notify SPD of compromised instruments and prevent their use in the OR.

Furthermore, system 50 can include a Set Assembly System 62 and an Instrument Distribution System 64. The Set Assembly System 62 can be adapted to manage inventory and set assembly of surgical instruments in a hospital or healthcare system's sterile processing department. Set Assembly System 62 can further automate storage, tracking, and assembly in the SPD, and assist SPD technicians with instrument selection, storage, organization, and set creation. Instrument Distribution System 64 may be an automated surgical instrument dispensing system for safely storing and dispensing surgical instruments at the point of care. System 50 may be automated to determine the locations of instruments in hand and in storage, and the vending solution may distribute necessary instruments for set creation. According to yet another exemplary embodiment, the surgical instrument management system 50 can include one or more of at least one cabinet 100, at least one cart 200, or any desired combination thereof. In some exemplary embodiments, cabinets 100 may be part of Set Assembly System 62, while carts 200 may be part of Instrument Distribution System 64.

Figure 2:
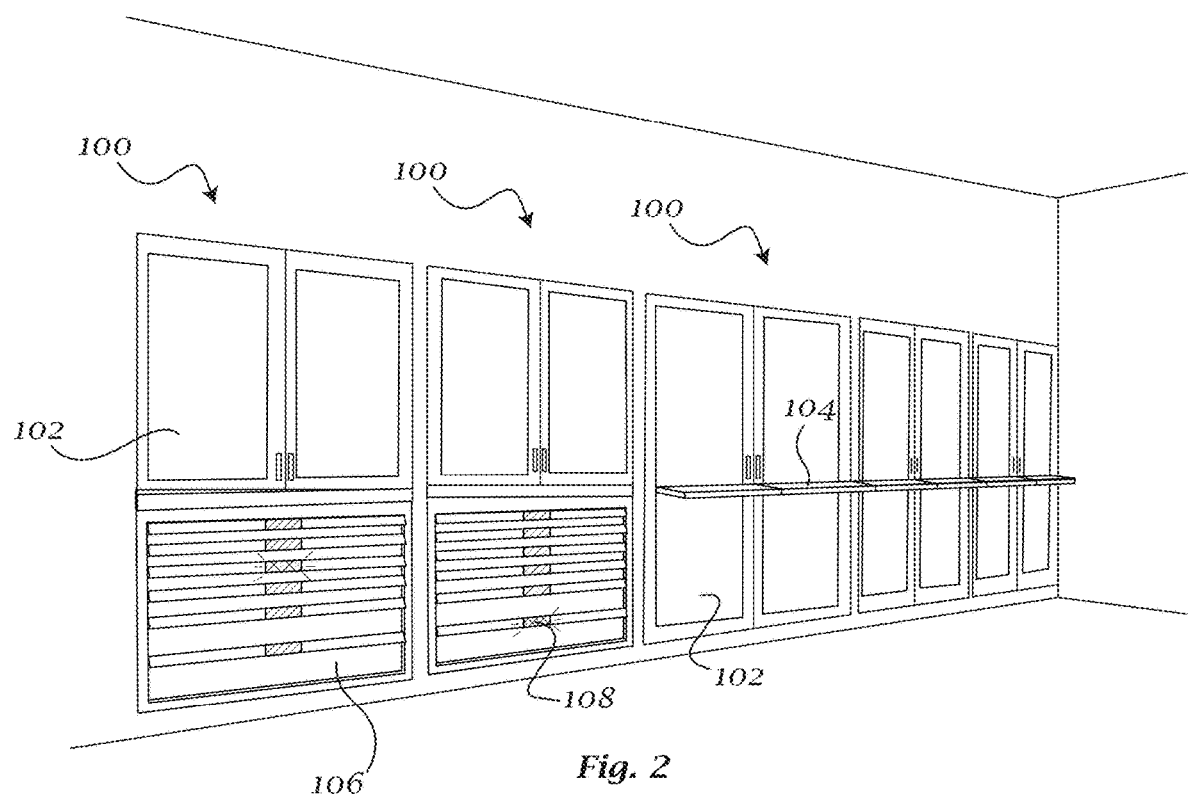
FIG. 2 shows an exemplary embodiment of a storage cabinet.
Figure 3A:
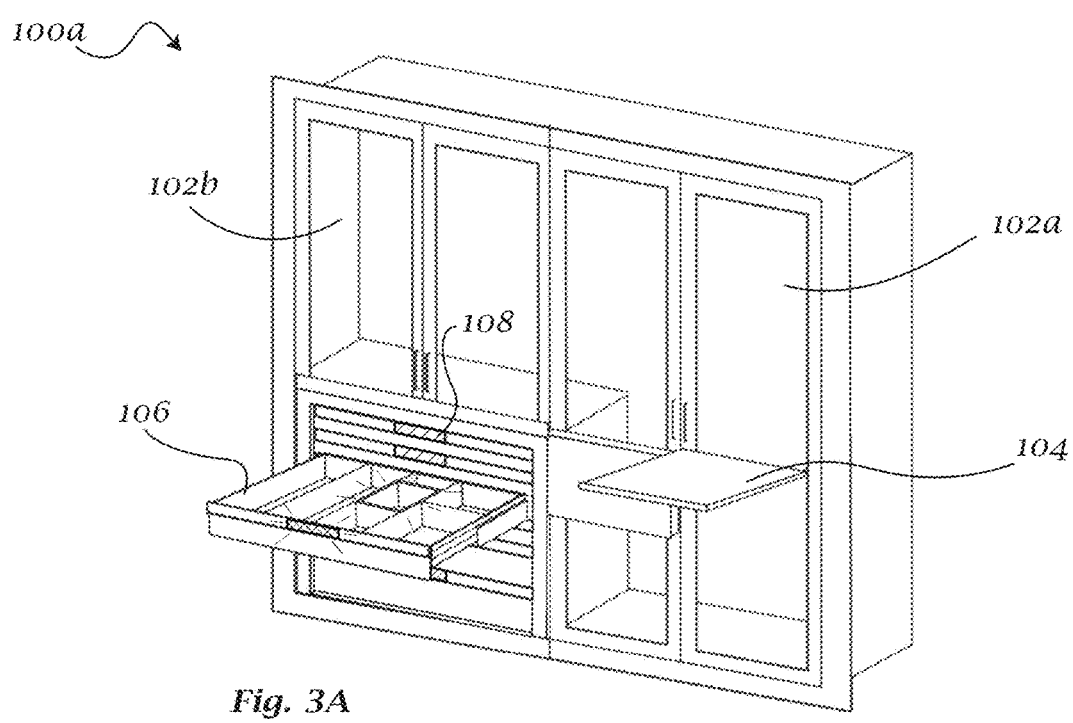
FIG. 3A shows another exemplary embodiment of a storage cabinet.
Figure 3B:
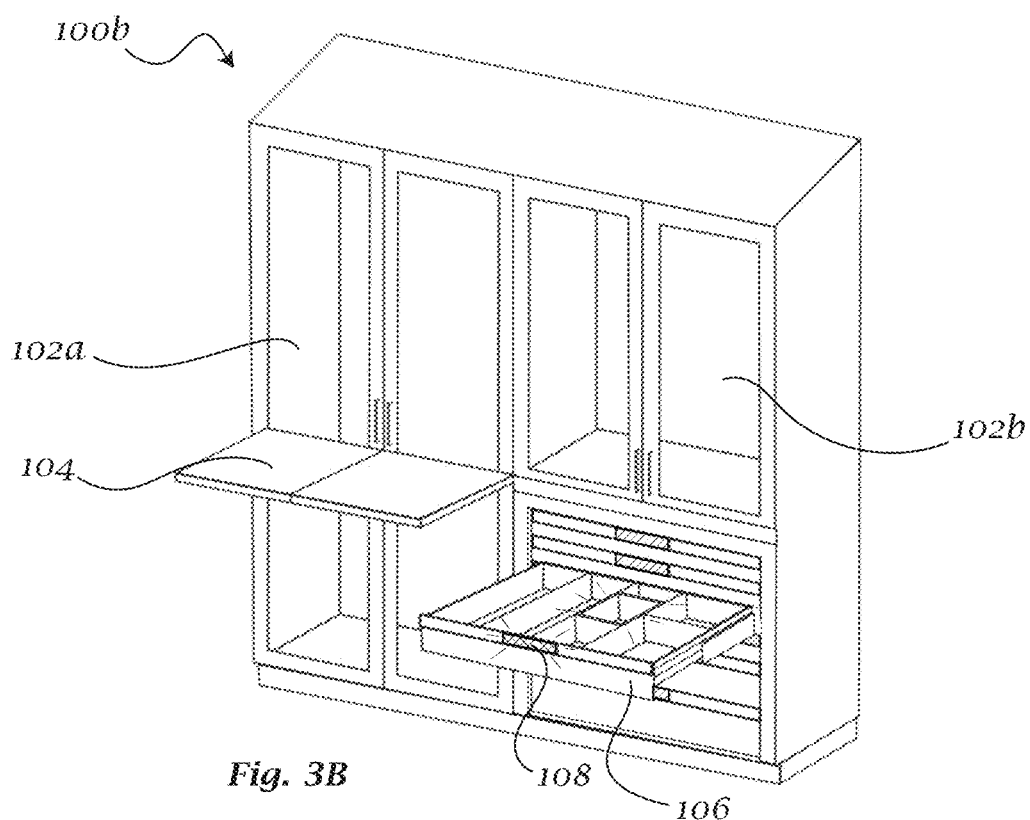
FIG. 3B shows another exemplary embodiment of a storage cabinet.
Figure 3C:
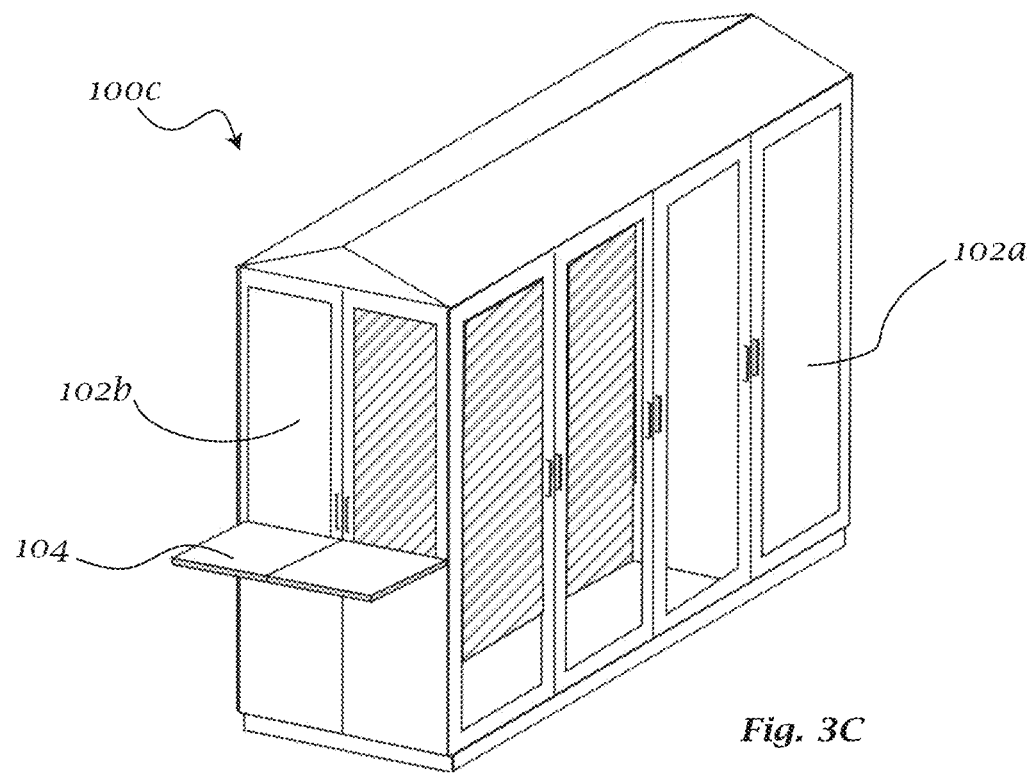
FIG. 3C shows another exemplary embodiment of a storage cabinet.

Turning to FIGS. 2-3, an exemplary embodiment of a storage cabinet 100 is disclosed. In some embodiments, storage cabinet 100 may be adapted to house a complete version of the storage and distribution system, including instruments, mechanical controls, and electronics. The cabinet may be constructed from, but not limited to, stainless steel. An exemplary construction of cabinet 100 may include a seamless welded face, doubled front edges, and a sloping top, if required. However, any construction that enables cabinet 100 to function as described herein may be contemplated and provided as desired. The cabinets can further include a plurality of doors 102, which may be formed from safety glass or any other material commonly used in the surgical instrument storage art. Exemplary embodiments of cabinet 100 can further include one or more work shelves 104, which may be hinged so as to be foldable. Cabinet 100 may be provided in three variants: a built-in variant 100a, a freestanding variant 100b, and a casework variant 100c. The freestanding and casework variants may offer mobile access and casters may optionally be provided. Such variants may be used when minimal alteration of a room is desired. The built-in variants, on the other hand, can allow for maximization of the room space. All variants of cabinet 100 may be modular and may be constructed to accommodate a variety of requirements, including full-height doors 102a, or split access with half-height doors 102b and drawers 106 above or below the doors. Drawers 106 may include lighting 108 to guide users to a desired drawer. Furthermore, in some exemplary embodiments, cabinet 100 may accommodate a rail system to provide a smaller footprint. Exemplary dimensions for a cabinet 100 may be 96"H×60"W×16"D (or 24"D with a rail system). However, any dimensions that allow cabinet 100 to function as described herein may be contemplated and provided as desired.

In some embodiments, doors 102 may be hingedly coupled to cabinet 100. The hinges may be semi-concealed stainless steel hinges, and three or another number of hinges may be provided. The outer frame of each door may be a one-piece unit and may be die formed or otherwise constructed so as to receive a gasketed safety glass panel. Doors 102 may be constructed from safety glass and stainless steel. The gasketed doors may facilitate providing a sealed environment within cabinet 100 so as to prevent contamination. In some embodiments, one door of the cabinet, for example the right-hand door, may be fitted with a locking handle and a three point latch, while one door of the cabinet, for example the left-hand door, may include a dummy knob and spring-loaded roller catches.

Disposed in the interior of cabinet 100 may be one or more of: a rail system 300, a modular pegboard 400, a ringless storage system 500, a cartridge board 600, and drawer system 700, as discussed further below.

Figure 4:
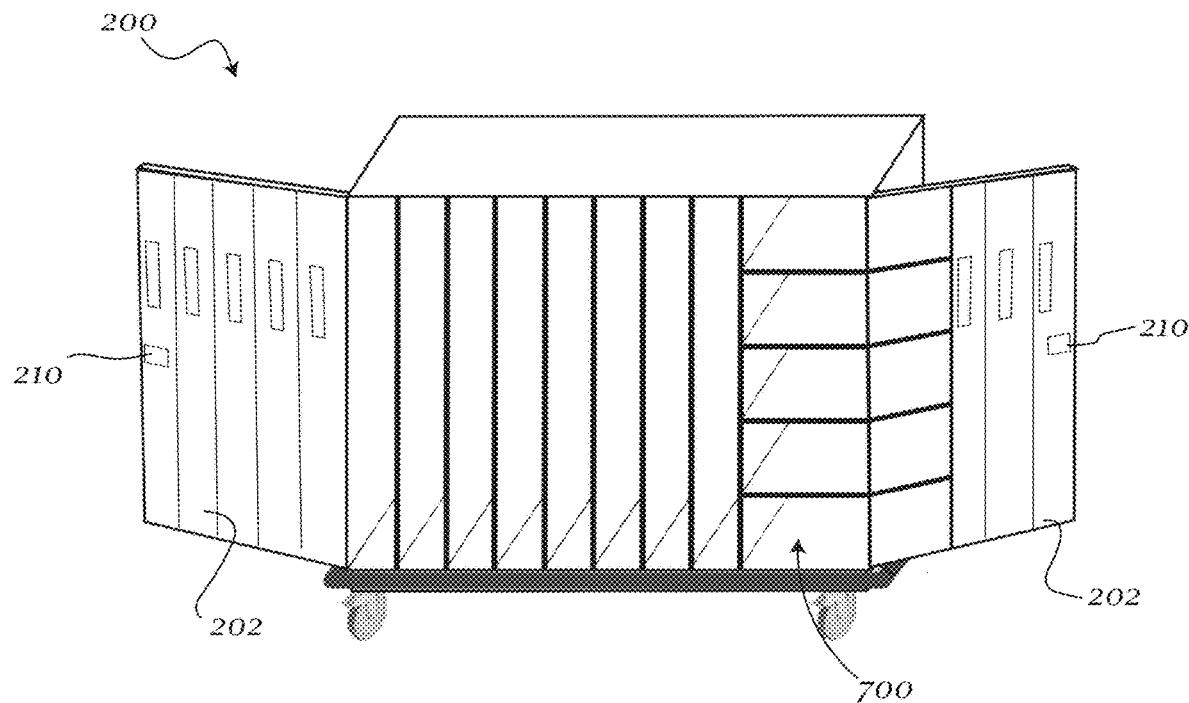
FIG. 4 shows an exemplary embodiment of a mobile storage cart.

Turning to FIG. 4, an exemplary embodiment of a mobile storage cart 200 is disclosed. In some embodiments, cart 200 may be adapted to house a complete version of the storage and distribution system, including instruments, mechanical controls, and electronics. In other embodiments, cart 200 may be communicatively coupled to system 50, for example via wireless communications. The cart may be constructed from, but not limited to, stainless steel. Cart 200 may further include swivel casters and exterior handles so as to provide mobility for the cart. A rub rail may be provided along the bottom edge of the cart. Cart 200 may further include an uninterruptible power supply. Exemplary dimensions for a cart 200 may be 48"H×60"W×24"D. However, any dimensions that allow cart 200 to function as described herein may be contemplated and provided as desired.

In some embodiments, cart 200 may include two hinged service doors 202 on a front side thereof. Each service door 202 may include a handle 210, such as a positive pull handle with locking mechanism so as to ensure a hermetic seal to prevent contamination of the interior of the cart. The service doors 202 may be configured to open and close independently. The service doors may be constructed from stainless steel. Exemplary dimensions for the service doors may be 48"H×30"W. However, any dimensions and materials for the doors that allow cart 200 to function as described herein may be contemplated and provided as desired.

Figure 5:
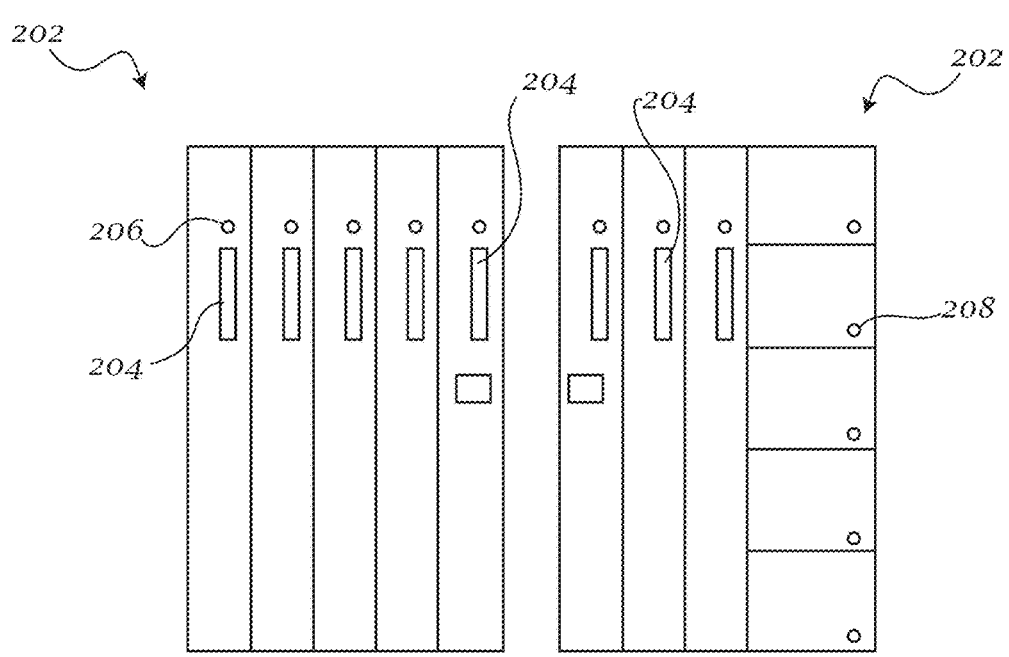
FIG. 5 shows an exemplary embodiment of doors for a mobile storage cart.

As shown in FIG. 5, a plurality of smaller distribution doors 204 may be provided within each service door. These distribution doors may be part of the instrument distribution system. In some exemplary embodiments, 5 distribution doors 204 may be provided on one service door 202 and 3 distribution doors 204 may be provided on the other service door 202. The distribution doors 204 may be designed to slide open internally so as to minimize the risk of damage to the doors themselves. Lighted push buttons 206 (for example, with LEDs) may be provided at each distribution door so as to guide users to the appropriate distribution door when instruments are available. Depressing a lighted push button 206 can allow a user to open the distribution door so as to receive the desired instrument. If the instrument is not removed within a predetermined amount of time, a visual and/or audio alarm may alert the user. Distribution doors 204 may be adapted to close automatically once an instrument is removed. The lighted indicators of the push buttons 206 can further be adapted to indicate an error or a service requirement.

Disposed in the interior of cart 200 may be one or more of: a rail system 300, a modular pegboard 400, a ringless storage system 500, a cartridge board 600, and drawer system 700, as discussed further below.

In some embodiments, one or both of the service doors 202 may provide access to a modular drawer system 700 for storing containerized instruments. To access the drawer system, the user may open a service door 202. Upon user request of a container, LED lighting 206 may prompt the user to open the service door 202 and may indicate the appropriate distribution drawer to the user. The drawer access door 208 may be disposed on the same hinge as the service door 202 and may be designed to open outward. The drawer system doors may be adapted to open and close manually and may include soft open and close capabilities. If the container is not removed within a predetermined amount of time, or the door is not closed properly, a visual and/or audio alarm may alert the user.

Figure 6:
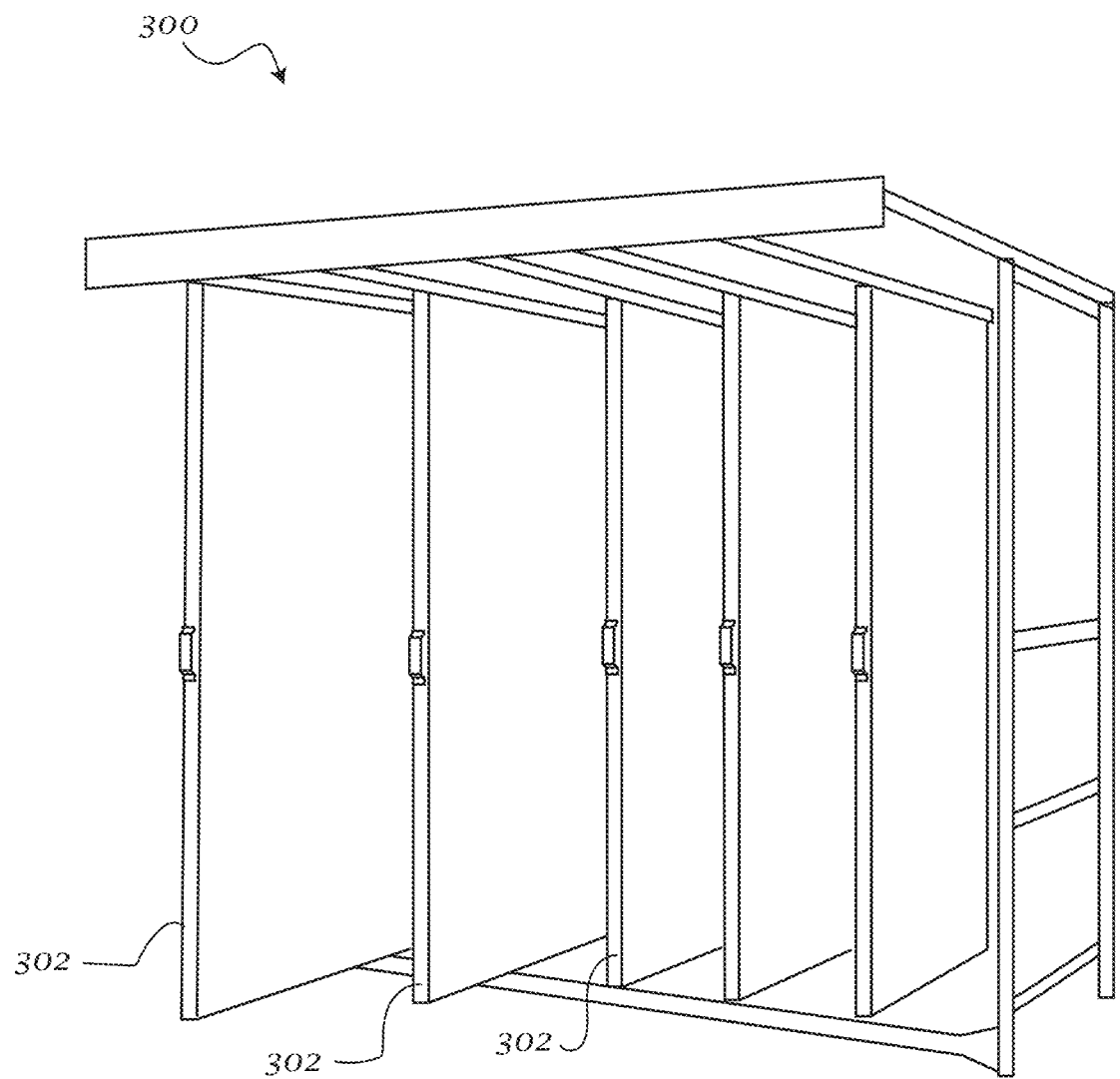
FIG. 6 shows an exemplary embodiment of a rail system.

As shown in FIG. 6, a rail system 300 may be a vertical apparatus adapted to organize, display, and maximize the storage capacity for surgical instruments. The rail system 300 may be a lateral sliding rack structure, having a plurality of sliding racks 302, which may be mounted on tracks 304 and may include soft-open and soft-close capabilities. The rail system 300 may further include a plurality of panels such as cartridge boards 500 or pegboards 400, each of which may be provided with a handle for withdrawing the panel. Each panel may be provided with lighting, for example LED lighting, that may illuminate each board individually and may function to guide the user during setup or diagnosis. Exemplary dimensions for a rail system 300 may be 48"H×48"W×24"D. However, any dimensions that allow rail system 300 to function as described herein may be contemplated and provided as desired.

Figure 7A:
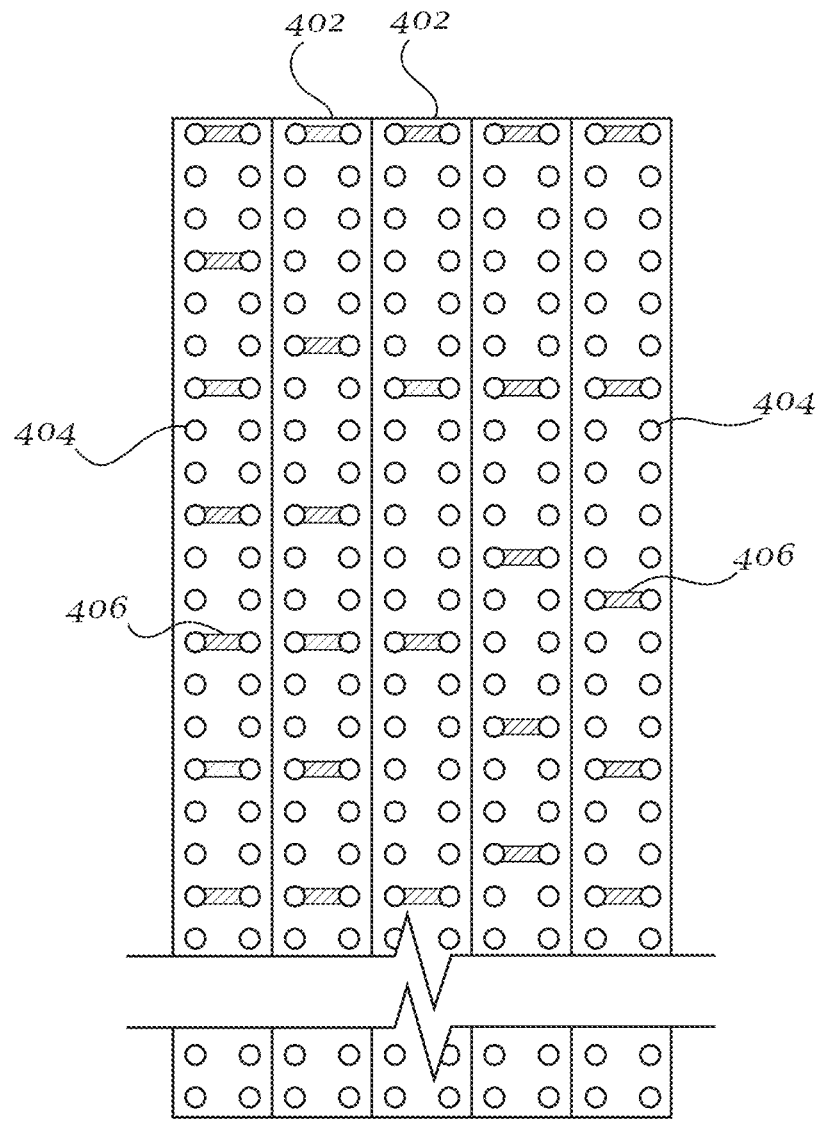
FIG. 7A shows an exemplary embodiment of a pegboard.

As shown in FIG. 7A, an exemplary embodiment of a pegboard 400 may be a perforated board that can accept threaded pegs 450 or similar attachments that hold ringed instruments. In some embodiments, pegboard 400 may be adapted to as panel of rail system 300. In some embodiments, a pegboard 400 may have columns 402, for example six columns or any other desired number of columns. Each column 402 may be provided with a plurality of threaded holes 404 disposed along the length of the column. For example, threaded holes 404 may be disposed 2.5" apart at 2" vertical increments. Pegboard 400 may further be provided with lighted indicators 406, for example LED indicators, so as to assist users in locating optimal locations for the pegs during setup. Exemplary dimensions for a pegboard 400 may be 48"H×30"W×48"D (or 48"H×24"W with a rail system). However, any dimensions that allow pegboard 400 to function as described herein may be contemplated and provided as desired.

Figure 7B:
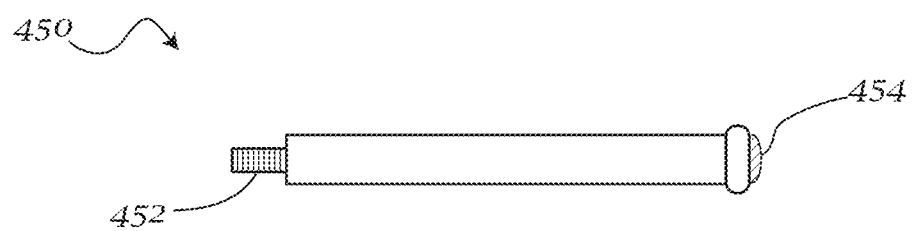
FIG. 7B shows an exemplary embodiment of a peg for a pegboard.

Turning to FIG. 7B, pegs 450 may be provided with threads 452 so as to secure pegs 450 in holes 404 of pegboard 400. Pegs 450 may also be provided with lighted indicators 454, for example LED indicators, in the distal ends thereof so as to aid users in identifying instrument storage locations and so as to provide diagnostic information.

As shown in FIGS. 8A-8B, a ringless storage cartridge 500 may be provided for ringless instruments or instruments that cannot be stored on pegs (e.g., forceps, narrow retractors, knife handles, and so forth). Each cartridge 500 can include a frame 502 in which a rotating grasp mechanism 550 (shown in detail in FIGS. 8C-8D) is disposed. Each cartridge 500 can include a plurality of instrument ports 552 disposed in a plurality of columns and rows. An exemplary cartridge configuration is 270 instrument ports in 27 columns and 10 rows. However, any configuration that allow storage cartridge 500 to function as described herein may be contemplated and provided as desired.

Storage cartridge 500 may be provided with lights 504, for example LED lights, so as to guide a user to load instruments into the instrument ports. The lights may further direct the user to reinsert the storage cartridge into the cabinet or attach it to the pegboard. Lights on the pegboard may further indicate a desired position for the cartridge on the pegboard. A linking mechanism (not shown) may be provided to couple the cartridge 500 to a pegboard 400. Lights 504 may further inform users when instruments need to be replaced or restocked, when the cabinet needs service, or for other reasons. To distribute an instrument, system 50 may control the rotating grasp mechanism, which can rotate on an axis of a clip so as to unfold and release an instrument. Exemplary dimensions for a ringless storage cartridge 500 may be 12"H×24"W×6"D or 6"H×24"W×6"D. However, any dimensions that allow cartridge 500 to function as described herein may be contemplated and provided as desired.

As shown in FIGS. 9A-9B, a cartridge board 600 may be provided. In some embodiments, cartridge board 600 may be adapted for rail system 300. Cartridge Board 600 may be provided as panels coupled to the rail system and may be designed so as to maximize storage configurations of the surgical instruments. In some embodiments, a cartridge board 600 may include five columns having a 4½" width. Each column may have parallel connection receptacles 602, disposed at regular increments, for example 2" vertical increments, for instrument cartridges 650. The instrument cartridges 650 may be adapted to contain peel-packaged instruments. A connection receptacle 602 may fasten the instrument cartridges in place and may release the cartridges when pulled. Indicator lighting 604, for example LED lighting, may be provided to display the mounting location of the instrument cartridge 650 during a setup process. The positions of the mounting locations may be calculated using "PCB-like" software so as to maximize storage capacity while accommodating the various size of surgical instruments. In some embodiments, depending on the instrument length (for example, 6"-12"), a cartridge board may accommodate 4-8 rows of instrument cartridges per column, resulting in 240-320 locations for various instrument patterns. However, any dimensions and configurations that enable the cartridge board to function as described herein may be contemplated and provided as desired.

As shown in FIG. 9C, an instrument cartridge 650 may be adapted to contain peel-packaged instruments therein. Each cartridge may be stocked with one instrument pattern type. The instruments may be peel-packaged prior to loading. A cartridge may be adapted to expand for easy loading, and to contract so as to condense the instruments prior to connecting to the cartridge board. A linking mechanism on the back of a cartridge may be adapted to attach to the connection receptacle on the cartridge board at the proper location as indicated by LED lighting during setup. Lighting 652, for example LED lighting, may be provided on the front side of the cartridge for guiding the user to the proper cartridge for replacement, restocking, or service. Based on instrument pattern type, each cartridge may be adapted to hold an average of 20 instruments. Therefore, in an exemplary embodiment having 240 or 320 pattern locations, the system may be able to store approximately 4,800 to 6,400 instruments.

Figure 10A:
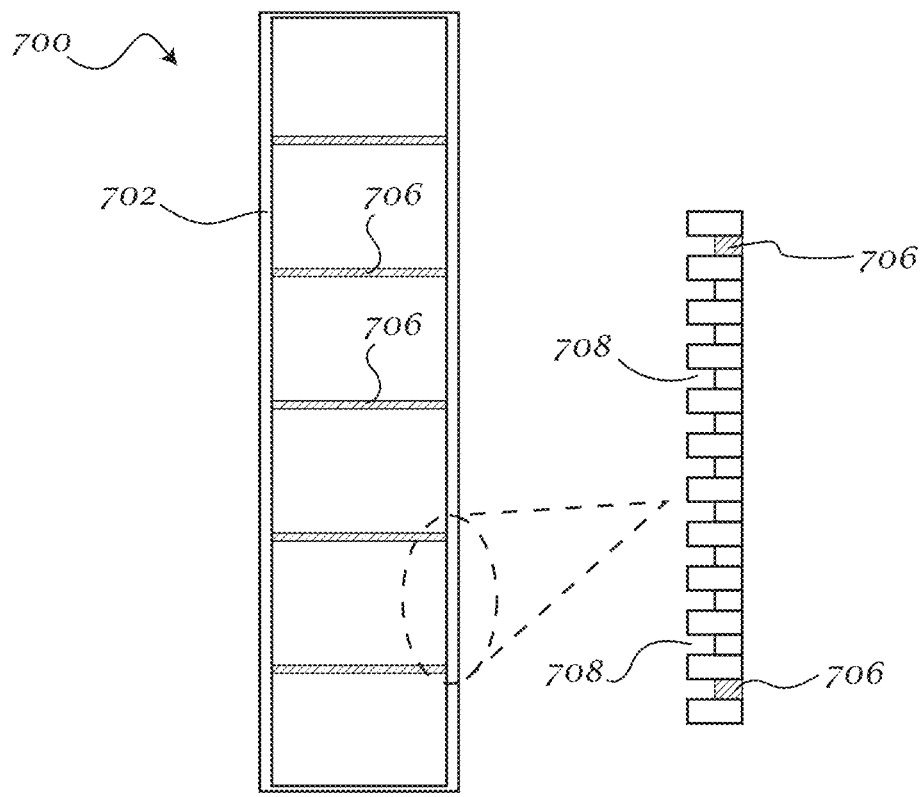
FIG. 10A shows an exemplary embodiment of a drawer system.
Figure 10B:
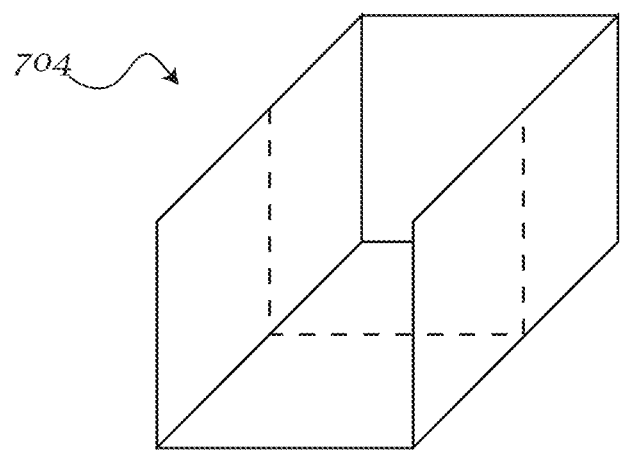
FIG. 10B shows an exemplary embodiment of a drawer system.

As shown in FIGS. 10A-10B, a drawer system 700 may include a modular shelving system having a shelving frame 702. The drawer system 700 may include shelves, which may be perforated and may be formed from stainless-steel. The shelves may be manually adjusted at desired increments, for example 1" increments, and may be disassembled for cleaning. Shelves may be placed into slots 708 provided at desired intervals along frame 702. Drawers 704 may be placed onto the shelves. Each drawer 704 may have a divider, for example a 12" divider, for half-size containers. Lighted guide indicators 706, for example LEDs, may be provided at desired intervals, for example at 8" intervals, along frame 702. The distribution system software and LED lighting guide 706 can direct the user to remove a desired container. If the instrument or container is not removed within a predetermined amount of time, a visual and/or audio alarm may alert the user to open an outer door and guide the user to the drawer location. Exemplary measurements for shelving frame 702 may be 48"H×12"W×24"D. Exemplary measurements for drawers 704 may be 8"H (or variable height)×12"W×24"D.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for medical instrument management and distribution, comprising:
    at least one storage enclosure configured to store and dispense a plurality of medical instruments;
    at least one storage structure disposed within the at least one enclosure, the at least one storage structure configured to store and dispense the plurality of medical instruments, the at least one storage structure having a plurality of discrete instrument storage locations;

a software application configured to track and manage medical instrument inventory, locations, and distribution, wherein each discrete instrument storage location of the plurality of discrete instrument storage locations is identified by an indicator controllable by the software application so as to indicate to a user an appropriate instrument storage location for placement or removal of a desired medical instrument and, after the desired medical instrument is not removed within a predetermined amount of time, an alarm is assigned to the respective discrete instrument storage location, wherein the at least one storage enclosure is a cabinet, wherein the cabinet is split access with half-height doors and drawers both above and below the half-height doors.

2. The system of claim 1, wherein the at least one storage structure includes a cartridge board.

3. The system of claim 1, wherein the at least one storage structure includes a drawer system.

4. The system of claim 1, wherein the cabinet is a mobile cart.

5. The system of claim 4, wherein the mobile cart comprises two hinged service door, wherein each service door has a positive pull handle.

6. The system of claim 5, wherein each service door comprises a plurality of smaller distribution doors.

7. The system of claim 6, wherein each distribution door comprises a lighted push button configured to permit opening of the respective distribution door after the respective lighted push button is depressed.

8. The system of claim 1, wherein the at least one storage structure includes a modular pegboard.

9. The system of claim 8, wherein the modular pegboard comprises a plurality of columns and each column comprises a plurality of threaded holes disposed along a length of a respective column.

10. The system of claim 9, wherein the modular pegboard further comprises a plurality of threads configured to secure respective pegs in the plurality of threaded holes.

11. The system of claim 1, wherein the at least one storage structure includes a ringless storage cartridge.

12. The system of claim 11, wherein the ringless storage cartridge comprises a plurality of cartridges and each cartridge comprises a frame having a rotating grasp mechanism.

13. The system of claim 12, wherein each cartridge further comprises a plurality of instrument ports disposed in a plurality of columns and a plurality of rows.

14. A storage enclosure for storing, managing, and dispensing medical instruments, comprising:

at least one storage structure disposed within the enclosure, the at least one storage structure configured to store and dispense a plurality of medical instruments, wherein the at least one storage structure has a plurality of discrete instrument storage locations;

a software application configured to track and manage medical instrument inventory, locations, and distribution, wherein each discrete instrument storage location of the plurality of discrete instrument storage locations is identified by an indicator controllable by the software application so as to indicate to a user an appropriate instrument storage location for placement or removal of a desired medical instrument, after the desired medical instrument is not removed within a predetermined amount of time, an alarm is assigned to the respective discrete instrument storage location, wherein the storage enclosure is a cabinet, wherein the cabinet is split access with half-height doors and drawers both above and below the half-height doors.

15. The system of claim 14, wherein the at least one storage structure is a modular pegboard.

16. The system of claim 14, wherein the at least one storage structure is a ringless storage cartridge.

17. The system of claim 14, wherein the at least one storage structure is a cartridge board.

18. The system of claim 14, wherein the at least one storage structure is a drawer system.

* * * * *